(12) United States Patent
Golden

(10) Patent No.: US 6,586,089 B2
(45) Date of Patent: Jul. 1, 2003

(54) EPOXY BASED REINFORCING PATCHES WITH IMPROVED ADHESION TO OILY METAL SURFACES

(75) Inventor: Michael R. Golden, Waterford, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/874,438

(22) Filed: Jun. 5, 2001

(65) Prior Publication Data

US 2002/0009582 A1 Jan. 24, 2002

Related U.S. Application Data

(60) Provisional application No. 60/209,739, filed on Jun. 6, 2000.

(51) Int. Cl.[7] ............................................... B32B 15/04
(52) U.S. Cl. ..................... 428/346; 428/40.2; 428/68; 428/200; 428/433; 156/273.5; 156/275.5; 156/307.3; 156/320; 156/329

(58) Field of Search ................................ 428/418, 416, 428/423.1, 212, 40.2, 41.1, 68, 413, 411.1, 200, 346, 433; 156/307.3, 329, 320, 273.5, 275.5, 306.6, 309.9

(56) References Cited

U.S. PATENT DOCUMENTS

| 4,444,818 | A | | 4/1984 | Tominaga et al. ............ 428/36 |
|---|---|---|---|---|
| 4,766,183 | A | * | 8/1988 | Rizk et al. |
| 4,803,105 | A | * | 2/1989 | Kretow et al. |
| 4,803,108 | A | | 2/1989 | Leuchten et al. ........... 428/118 |
| 4,842,938 | A | | 6/1989 | Rizk et al. .................. 428/416 |
| 4,900,601 | A | * | 2/1990 | Halg et al. |
| 4,929,483 | A | | 5/1990 | Halg et al. .................... 428/47 |
| 5,092,947 | A | | 3/1992 | Halg et al. .................... 156/82 |

FOREIGN PATENT DOCUMENTS

| EP | 0 325 058 | 12/1988 | ........... C08G/59/22 |
|---|---|---|---|

\* cited by examiner

*Primary Examiner*—Merrick Dixon

(57) ABSTRACT

Reinforcing sheets that exhibit improved adhesion to cold and/or oily substrates have an adhesive layer that contains an epoxy-terminated adduct of an epoxy resin and a rubber that contains a low amount of a nitrile monomer.

20 Claims, No Drawings

EPOXY BASED REINFORCING PATCHES WITH IMPROVED ADHESION TO OILY METAL SURFACES

This Application claims benefit of Provisional No. 60/209,739 filed Jun. 6, 2000.

BACKGROUND OF THE INVENTION

This invention relates to reinforcing sheets such as those adapted for applying localized reinforcement to sheet metal or sheet plastic structures.

It is common practice in the automotive industry to apply reinforcing sheets to sheet metal and other parts for localized, lightweight reinforcement. Examples of such reinforcing sheets are described, for example, in U.S. Pat. No. 4,444,818 to Tominaga, U.S. Pat. No. 4,766,183 and U.S. Pat. No. 4,842,938 to Rizk et al., U.S. Pat. No. 4,803,105 to Kretow et al., U.S. Pat. No. 4,803,108 to Leuchten et al., and U.S. Pat. Nos. 4,900,601, 4,929,483 and 5,092,947 to Hälg et al. Generally, these reinforcing sheets include one or more layers of a stiffening material and one or more layers of a polymeric material that acts as a binder for the stiffening material as well as an adhesive for securing the reinforcing sheet to a substrate. Often, protective foils, moisture barriers and other layers may be included in the reinforcing sheet.

A common adhesive for these reinforcing sheets is described in U.S. Pat. No. 4,803,105. That adhesive includes a mixture of an epoxy resin, a curing agent and a carboxy-terminated butadiene-acrylonitrile rubber. The butadiene-acrylonitrile rubber commonly used contains about 18 weight % or more polymerized acrylonitrile, has a glass transition temperature of about −52° C. or higher and has a solubility parameter, as reported by its manufacturer, of about 8.82 or above. The amount of the butadiene-acrylonitrile rubber is such that the adhesive as a whole contains about 4% or more by weight polymerized acrylonitrile. The rubber is typically pre-reacted with a portion of the epoxy resin before being formulated into the adhesive mixture. The rubber imparts a certain amount of toughness to the adhesive once it is cured.

In the automotive industry, these reinforcing sheets are typically applied to exterior body panels. Because the epoxy resin in these reinforcing sheets must be cured, the reinforcing sheets are usually applied before the body panel is painted, so that the epoxy resin and paint can be cured simultaneously. Often, the unpainted body panel (or other substrate) is contaminated with oily materials. In other cases, the substrate is cold for one reason or another when the reinforcing sheet is applied.

The epoxy adhesive commonly used in the reinforcing sheets does not adhere well to oily or cold surfaces. When these conditions are present, the manufacturer either accepts that a certain amount of reinforcing sheets will be poorly adhered, or else the substrate parts must be warmed and/or cleaned before applying the reinforcing sheet. Neither of these options is attractive. Warming and cleaning the substrate introduce extra steps into the process of assembling a vehicle. This in turn imposes extra costs for time, energy and handling. It would be desirable to provide a reinforcing sheet that adheres better to oily or cold substrates.

SUMMARY OF THE INVENTION

This invention is a reinforcing sheet comprising at least one layer of a reinforcing material and a layer of a solid thermosetting adhesive, wherein the thermosetting adhesive includes (a) a curing agent and (b) an epoxy-terminated adduct of an epoxy resin and a conjugated diene or conjugated diene/nitrile rubber containing not more than about 15% by weight polymerized nitrile monomer, and wherein said thermosetting adhesive contains no more than about 3.5% by weight polymerized nitrile monomer.

Surprisingly, the reinforcing sheet of the invention adheres well to oily substrates as well as to colder substrates, compared to otherwise similar reinforcing sheets in which the nitrile monomer content in the thermosetting adhesive layer is somewhat higher.

In a second aspect, this invention is a method of reinforcing a substrate, comprising
(A) applying to the substrate a reinforcing sheet comprising at least one layer of a reinforcing material and a layer of a solid thermosetting adhesive, wherein the thermosetting adhesive includes (a) a curing agent and (b) an epoxy-terminated adduct of an epoxy resin and a conjugated diene or conjugated diene/nitrile rubber containing not more than about 15% by weight polymerized nitrile monomer, and wherein said thermosetting adhesive contains no more than about 3.5% by weight polymerized nitrile monomer, and then
(B) curing said thermosetting adhesive.

DETAILED DESCRIPTION OF THE INVENTION

The thermosetting adhesive layer of the invention includes an epoxy-terminated adduct of an epoxy resin and a diene rubber or a conjugated diene/nitrile rubber having containing not more than about 15% by weight polymerized nitrile monomer. This adduct is suitably prepared in the reaction of a polyepoxide with a carboxy-functional conjugated diene rubber or a conjugated diene/nitrile rubber.

The diene rubber is a polymer of a conjugated diene monomer such as butadiene, isoprene, and the like. Butadiene rubbers are preferred. Conjugated diene/nitrile rubbers are copolymers of a conjugated diene and an ethylenically unsaturated nitrile monomer, of which acrylonitrile is the most preferred one. When a conjugated diene/nitrile rubber is used, at least one such rubber present in the composition contains less than about 15 weight percent polymerized unsaturated nitrile, and preferably no more than about 12 weight percent polymerized unsaturated nitrile. The rubber also contains terminal groups that will react with an epoxide to form a covalent bond thereto. Preferably, the rubber contains from about 1.5, more preferably from about 1.8, to about 2.5, more preferably to about 2.2, of such terminal groups per molecule, on average. Carboxyl-terminated rubbers are preferred.

The rubber is preferably a liquid at room temperature, and preferably has a glass transition temperature of less than about −55° C., preferably from about −60 to about −90° C. The molecular weight ($M_n$) of the rubber is suitably about 2000 to about 6000, more preferably from about 3000 to about 5000.

Suitable carboxyl-functional butadiene and butadiene/acrylonitrile rubbers are commercially available from B. F. Goodrich under the trade names Hycar® 2000X162 carboxyl-terminated butadiene homopolymer and Hycar® 1300X31 carboxyl-terminated butadiene/acrylonitrile copolymer. A suitable amine-terminated butadiene/acrylonitrile copolymer is sold under the tradename Hycar® 1300X21.

In addition, a conjugated diene or conjugated diene/nitrile rubber having a somewhat higher polymerized nitrile content ("high nitrile rubber") can be used in addition to the rubber described above. Higher acrylonitrile content provides better adhesion between the polymer and some substrates such as glass, and tends to increase flexural strength somewhat. The high nitrile rubber also preferably contains terminal epoxy-reactive groups. The high nitrile rubber advantageously contains from above 15%, more preferably at least about 18% to about 40%, more preferably to about 32% polymerized nitrile monomer. The high nitrile rubber suitably has a molecular weight of about 3000 to about 6000, and contains from about 1.5 more preferably from about 1.8, to about 2.5, more preferably to about 2.2, epoxy-reactive terminal groups per molecule, on average. Examples of such high nitrile rubbers are Hycar® 1300X8, Hycar® 1300X13®, Hycar® 1300X9 and Hycar® 1300X18 carboxyl-terminated butadiene acrylonitrile copolymers, all commercially available from B. F. Goodrich.

The rubbers (i.e., the conjugated diene or conjugated diene/nitrile rubber, plus the high nitrile rubber, if used) are present in an amount such that the thermosetting composition contains no more than about 3.5% polymerized nitrile monomer. It is more preferred that the thermosetting adhesive contains from about 1 to about 3.25% by weight polymerized nitrile monomer. Preferably, the rubbers constitute from about 5, more preferably from about 10, to about 40, more preferably to about 25% of the total weight of the thermosetting adhesive. The high nitrile rubber preferably constitutes no more than 50, preferably no more than about 45%, more preferably no more than about 35% of the combined weight of all rubbers.

The conjugated diene or conjugated diene/nitrile rubber is formed into an epoxy-terminated adduct by reaction with an excess of a polyepoxide. Any high nitrile rubber that is used is similarly converted into an epoxy-terminated adduct. A wide variety of polyepoxide compounds such as cycloaliphatic epoxides, epoxidized novolac resins, epoxidized bisphenol A or bisphenol F resins, butanediol polyglycidyl ether, neopentyl glycol polyglycidyl ether or flexibilizing epoxy resins can be used, but generally preferred on the basis of cost and availability are liquid or solid glycidyl ethers of a bisphenol such as bisphenol A or bisphenol F. Halogenated, particularly brominated, resins can be used to impart flame retardant properties if desired. For forming the adduct, liquid epoxy resins (such as DER 331, available from The Dow Chemical Company) are especially preferred for ease of handling in making the adduct. Typically, the rubber and an excess of the polyepoxide are mixed together with a polymerization catalyst such as a substituted urea or phosphine catalyst, and heated to a temperature of about 100–250° C. in order to form the adduct. Preferred catalysts include phenyl dimethyl urea and triphenyl phosphine. Preferably, enough of the polyepoxide compound is used that the resulting product is a mixture of the adduct and free polyepoxide compound.

If the adduct is not a solid at room temperature (about 28° F.), it is suitably blended with a normally solid (at room temperature) epoxy resin. An example of such a solid epoxy resin is a polyglycidyl ether of bisphenol A or bisphenol F having an epoxy equivalent weight of about 300 to about 1000. Enough of the solid epoxy resin is blended with the adduct so the resulting mixture is solid at room temperature.

Alternatively, blends of two or more polyepoxide compounds can be reacted with the rubber so as to directly form a solid adduct.

The thermosetting adhesive also contains a curing agent. A large number of curing agents are useful, particularly those that require elevated temperatures (i.e., above about 50° C.) to cure. Advantageously, Lewis acids, substituted imidazoles or amine salts can be used as curing agents. Blocked amine curing agents such as those made by the reaction of approximately equimolar amounts of an anhydride and a polyamine are also useful. Such blocked amine curing agents are described in U.S. Pat. No. 4,766,183, the relevant portions of which are incorporated by reference. An especially useful curing agent is dicyandiamide. The curing agent is used in amounts sufficient to provide a complete cure, such as about 0.25 to about 10, preferably about 2 to about 5 percent of the weight of the thermosetting adhesive.

The thermosetting adhesive preferably is cellular when fully cured and/or contains a quantity of microspheres in order to reduce density. Suitable microspheres include those made from inorganic materials such as glass and silica-alumina ceramics or polymeric materials such as epoxy resin, unsaturated polyester resin, silicone resin, phenolics, polyvinyl alcohol, polyvinyl chloride, polypropylene, and polystyrene. In addition, fly ash that is in the form of hollow particles can be used. Examples of commercially available fly ash of this type is sold by Boliden Intertrade, Inc., under the trade names Fillite 100 and Fillite 150. Glass microspheres are most preferred. These microspheres most advantageously have average diameters of from about 5 to about 150 microns, preferably from about 20 to about 85 microns. In addition, the microspheres advantageously have a bulk density of from about 0.1 to about 0.5 g/cc. If desired, the microspheres may be surface treated with an interfacial adhesion promoter such as a silane compound.

Microspheres preferably constitute from about 5, more preferably from about 10, to about 30, more preferably to about 20, percent of the total weight of the thermosetting adhesive.

In addition, the thermosetting adhesive may also contain a blowing agent that becomes activated at the curing temperature to expand the adhesive layer. Suitable blowing agents include physical blowing agents such as hydrocarbons, hydrofluorocarbons, hydrochlorofluorocarbons and the like, but more preferably include chemical blowing agents such as azobisformamide and the like.

In addition, the thermosetting adhesive may contain one or more other fillers or rheology control agents. Suitable fillers include talcs, clays, silicas, calcium carbonate, graphite, glass, carbon black, plastic powders such as ABS, and the like. Magnetic particles such as ferromagnetic particles may be used as a filler, as well. Suitable rheology control agents include fumed silica and certain clays such as bentonite clay and montmorillonite clay.

The thermosetting adhesive can include a plasticizer for impact and thermal shock resistance improvement. Advantageously, benzoates, adipates, terephthalates and phthalates can be used as the plasticizer. A terephthalate or phthalate, for example dibutyl phthalate, is preferred.

In addition, the thermosetting adhesive can further contain a flame retardant, such as hydrated alumina or antimony oxide.

The thermosetting adhesive is preferably formulated to be tacky at a temperature of about 15° to about 40° C.

The thermosetting adhesive is applied to at least one side of a reinforcing layer. The reinforcing layer is preferably made of a stiff yet flexible construction, in order to provide reinforcement when applied to a substrate, and yet conform to the shape of the substrate. Preferred reinforcing materials are fibers of stiff materials such as glass, polyamide resin, polypropylene resin, carbon and the like, as well as aluminum sheet or foil, films of high melting thermoplastic resins such as Mylar, that may be fiber-reinforced. More preferred reinforcing materials are woven fabrics of stiff fibers as just described, especially woven glass fabrics. Mixtures of two or more different fibers can be woven together if desired. For example, carbon fibers may be woven into a glass fabric to increase stiffness at a moderate cost. The reinforcing layer preferably has a thickness of 0.003 inch to 0.050 inch.

The reinforcing layer may have a planar and/or smooth configuration, or may include three-dimensional features to further increase stiffness and/or adapt the reinforcing sheet for a particular application. For example, the reinforcing layer may have a ribbed configuration such as is described in FIGS. 3–5 of U.S. Pat. No. 4,803,105, the relevant portions of which are incorporated herein by reference.

Another suitable reinforcing layer is a honeycomb structure as described in U.S. Pat. No. 4,803,108. These honeycomb structures include a perforated honeycomb member having columns that define cell apertures with open ends. The honeycomb structure is suitably formed of any material that remains stable up to the curing temperature of the thermosetting adhesive and exhibits sufficient adhesion to the thermosetting adhesive layer and sufficient flexibility to conform to the shape of the panel to be reinforced. Advantageously, the honeycomb structure is formed of a metal alloy plate. Because of its light weight, corrosion resistance, ready accessibility, inexpensive cost and high flexibility, aluminum is most preferred for forming the honeycomb structure.

The columns of the honeycomb structure are integrally connected to form a multitude of cell apertures with open ends. The cells of the honeycomb structure may be hexagonal, triangular, square, polyhedral or other convenient shapes. The columns of the honeycomb structure are sufficiently thick, and the cell apertures defined by the columns have a suitable cell size and core density, such that the honeycomb structure maintains its integrity while maintaining the capability to conform to the shape of the substrate and without unacceptably increasing the weight of the reinforcing sheet. The preferred aluminum honeycomb columns suitably have a thickness of 0.0005 inch to 0.005 inch (0.013–0.13 mm, preferably 0.0007 inch to 0.004 inch (0.0018–0.1 mm). The cell apertures suitably have a cell size of $1/16$ inch to $7/8$ inch (1.6–22.2 mm), preferably $3/16$ inch to $5/16$ inch (4.8–8.0 mm), and a core de of 1.0 pound per cubic foot to 12.0 pounds per cubic foot (1.6–19.2 kg/m$^3$), preferably 3.0 pounds per cubic foot to 8.0 pounds per cubic foot (4.8–12.8 kg/m$^3$). The honeycomb member suitably has a thickness of $1/16$ inch to 4 inches (1.6–102 mm), preferably $1/8$ inch to $3/4$ inch (3.2–19 mm).

In addition, the reinforcing sheet may contain one or more additional functional layers, such as a moisture barrier layer as described in U.S. Pat. No. 4,803,105. The presence of such a moisture impermeable barrier permits the reinforcing sheet to be stored for long periods of time, for example three to six months, with minimal adverse effects due to the absorption of moisture, even under humid conditions. Another useful functional layer is a release sheet, typically paper, which covers the exposed surface of the adhesive layer that is brought into contact with the substrate to be reinforced. If desired, a slit, heat-shrinkable protection foil of the type described in U.S. Pat. No. 4,900,601 can be used on the surface of the adhesive layer.

The reinforcing sheet advantageously is prepared by applying a layer of the thermosetting adhesive to the reinforcing layer. A convenient way of accomplishing this is to spread a layer of the thermosetting adhesive onto a release layer or protection foil with a coating knife to a uniform thickness suitably of 0.01 inch to 0.10 inch (0.25–2.5 mm), preferably 0.02 inch to 0.05 inch (0.5–1.25 mm). The reinforcing layer is then placed on the thermosetting adhesive layer and pressed in with a pressure roll. The entire reinforcing sheet is then pressed with a roller to provide a sheet with total thickness suitably of 0.03 inch to 0.30 inch (0.75–7.5 mm), preferably 0.04 inch to 0.10 inch (1.0–2.5 mm).

To apply the reinforcing sheet to the substrate to be reinforced, the exposed surface of the thermosetting adhesive layer is brought in contact with the panel. An advantage of the reinforcing sheet of this invention is that it adheres well to substrates that are somewhat oily or somewhat cold. Thus, the reinforcing sheet is of particular interest when applied to a substrate that is at a temperature of from about 15° C. to about 40° C., preferably from about 12° C. to about 35° C. The reinforcing sheet of the invention exhibits substantially improved adhesion to substrates at temperatures of about 15° C. to about 22° C., compared to previous reinforcing sheets in which the thermosetting adhesive contained only a high nitrile rubber.

The substrate and applied reinforcing sheet are subsequently heated to cure the thermosetting adhesive. This is conveniently done at a temperature of from about 150° C. to about 200° C., for a period of about 15 minutes to about 1 hour. This curing step can be done simultaneously with other treatments requiring heating, such as curing paints or E-coats.

The following examples are provided to illustrate the invention, but are not intended to limit the scope thereof. All parts and percentages are by weight unless otherwise indicated.

EXAMPLE 1

An epoxy-terminated adduct is prepared by blending 59.85 parts of a liquid epoxy resin (DER 331, from The Dow Chemical Company), 0.33 part of triphenyl phosphine, 22.86 parts of Hycar® 1300X31 butadiene/acrylonitrile rubber and 16.96 parts of Hycar® 1300X18 butadiene/acrylonitrile rubber. Hycar® 1300X31 rubber is a carboxyl-terminated, 3800 $M_n$ polymer containing 10% by weight polymerized acrylonitrile. According to the manufacturer, Hycar® 1300X31 rubber has a glass transition temperature of about −66° C. and a calculated solubility parameter of 8.46. Hycar® 1300X18 rubber is a carboxyl-terminated, 3400 $M_n$ copolymer containing 21.5% polymerized acrylonitrile. As reported by the manufacturer, it has a glass transition temperature of −46° C. and a solubility parameter of 8.99. The blended mixture is heated to about 100° C. for about 3 hours to form the desired epoxy-terminated adduct.

The epoxy-terminated adduct (70.23 parts) is then blended with 29.77 parts of a solid epoxy resin, DER 661, sold by The Dow Chemical Company. A portion of the resulting blend (75.7 parts) is mixed with 4.3 parts dicyandiamide, 6 parts of a clay filler and 14 parts of glass microspheres (K25, sold by 3M Corporation) to form Thermosetting Adhesive 1. Thermosetting Adhesive 1 contains about 3.1% polymerized acrylonitrile.

Example 2 and Comparative Adhesive A

Thermosetting Adhesive 2 is made in the same general way as described in Example 1, except that Hycar® 1300X31 is the only rubber used. The overall proportions of raw materials (exclusive of catalysts) are:

| | |
|---|---|
| DER 331 epoxy resin | 32.9 parts |
| Hycar ® 1300X31 rubber | 21.9 parts |
| DER 661 epoxy resin | 21.8 parts |
| Dicyandiamide | 4.3 parts |
| Microspheres | 13.2 parts |
| Clay | 6.0 parts |

The acrylonitrile content of Thermosetting Adhesive 2 is 2.2% by weight.

For comparison, Comparative Adhesive A is made in the same general process as described in Example 1, except that the only rubber used is Hycar® 1300X8. Hycar® 1300X8 is reported by its manufacturer to have an acrylonitrile content of 18% by weight, a molecular weight ($M_n$) of 3550, an average carboxyl functionality of 1.8 and a glass transition temperature of −52° C. The overall proportions of raw materials (exclusive of catalysts) are:

| | |
|---|---|
| DER 331 epoxy resin | 32.6 parts |
| Hycar ® 1300X8 rubber | 21.7 parts |
| DER 661 epoxy resin | 22.6 parts |
| Dicyandiamide | 4.3 parts |
| Microspheres | 13.2 parts |
| Clay | 5.1 parts |
| Phthalate Plasticizer | 5.1 parts |

The acrylonitrile content of Comparative Adhesive A is 4% by weight.

The tack of Thermosetting Adhesive 2 is evaluated in the following manner: Multiple patch samples are prepared by applying a 1×6 inch (2.5×15 cm) piece of Hexcel-Schwebel 7544 woven fiberglass mat over the adhesive to form patches having a total thickness of 1.3 mm. The patches are then applied to oily pieces of steel having dimensions of 4×6 inches (10×15 cm) and a thickness of 0.031 inch (0.79 mm). The steel is at a temperature of 70° F. (21° C.). A force of 4.5 lb (20 N) is applied to the patch against the steel to simulate application of the patch by hand as in a vehicle assembly plant. The patch is then allowed to "wet out" for varying periods at 70° F. The adhesion of the patch is evaluated on an Instron tensile test machine.

Similar tests are also run with Thermosetting Adhesive 2, at a temperature of 50° F. In addition, Comparative Adhesive A is evaluated at 70° F. Results are summarized in Table 1 below.

TABLE 1

| | Peel Strength (grams/inch) | | |
|---|---|---|---|
| Wet-Out Time (min) | Thermosetting Adhesive 2/70° F. (21° C.) | Thermosetting Adhesive 2/50° F. (10° C.) | Comparative Adhesive A*/70° C. (21° C.) |
| 5 | 50 | 35 | 20 |
| 30 | 160 | 72 | 50 |
| 45 | 225 | 100 | 55 |
| 60 | 275 | 100 | 60 |
| 90 | 345 | 145 | 65 |

*Not an example of the invention.

At all wet-out times Thermosetting Adhesive 2 exhibits a peel strength at 70° F. that is at least 250% that of Comparative Adhesive A at the same temperature. At 50° F., the peel strengths of Thermosetting Adhesive 2 are reduced, compared to the values at 70° F., thus illustrating the effect of substrate temperatures on adhesion. However, the values for Thermosetting Adhesive 2 at 50° F. are still much greater than those of Comparative Adhesive A at 70° F.

EXAMPLES 3–5

Thermosetting Adhesive 3 is made in the same general way as described in Example 1, except that the rubbers used are Hycar® 1300X31 and Hycar® 1300X8. The overall proportions of raw materials (exclusive of catalysts) are:

| | |
|---|---|
| DER 331 epoxy resin | 31.8 parts |
| Hycar ® 1300X31 rubber | 18.1 parts |
| Hycar ® 1300X8 rubber | 3.1 parts |
| DER 661 epoxy resin | 23.4 parts |
| Dicyandiamide | 4.3 parts |
| Microspheres | 14.0 parts |
| Clay | 6.0 parts |

The acrylonitrile content of Thermosetting Adhesive 3 is 2.4% by weight.

Thermosetting Adhesive 4 is made in the same general way as described in Example 1, except that the rubbers used are Hycar® 1300X31 and Hycar® 1300X13. Hycar® 1300X13 is reported by its manufacturer to have an acrylonitrile content of 26% by weight, a molecular weight ($M_n$) of 3150, an average carboxyl functionality of 1.8 and a glass transition temperature of −39° C. The overall proportions of raw materials (exclusive of catalysts) are:

| | |
|---|---|
| DER 331 epoxy resin | 31.9 parts |
| Hycar ® 1300X31 rubber | 12.2 parts |
| Hycar ® 1300X13 rubber | 8.9 parts |
| DER 661 epoxy resin | 22.6 parts |
| Dicyandiamide | 4.3 parts |
| Microspheres | 14.0 parts |
| Clay | 6.0 parts |

The acrylonitrile content of the Thermosetting Adhesive 4 is 3.5% by weight.

Thermosetting Adhesive 5 is made in the same general way as described in Example 3, with different proportions of ingredients. The overall proportions of raw materials (exclusive of catalysts) are:

| | |
|---|---|
| DER 331 epoxy resin | 31.9 parts |
| Hycar ® 1300X31 rubber | 18.1 parts |
| Hycar ® 1300X8 rubber | 3.1 parts |
| DER 661 epoxy resin | 22.6 parts |
| Dicyandiamide | 4.3 parts |
| Microspheres | 14.0 parts |
| Clay | 6.0 parts |

The acrylonitrile content of Thermosetting Adhesive 5 is 2.6% by weight.

Thermosetting Adhesives 3–5 are used to form duplicate patch samples by applying a 1×6 inch (2.5×15 cm) piece of Hexcel-Schwebel 7544 woven fiberglass mat to the adhesive to form patches having a total thickness of 1.3 mm. The patches are then applied at 70° F. to oily steel having dimensions of 1×6×0.031 inches (2.5 cm×15 cm×0.79 mm). A roller is run over the samples twice to provide intimate contact of the adhesive to the metal. The samples are then baked at 182° C. for 18 minutes and cooled. The samples are then evaluated in a three-point bend test according to ASTM D790M-93. Results are as reported in Table 2.

TABLE 2

| Test | Thermosetting Adhesive 3 | | Thermosetting Adhesive 4 | | Thermosetting Adhesive 5 | |
|---|---|---|---|---|---|---|
| | Test Sample 1 | Test Sample 2 | Test Sample 1 | Test Sample 2 | Test Sample 1 | Test Sample 2 |
| Load required to produce 2 mm deflection, N | 40 | 38 | 49 | 48 | 40 | 39 |
| Load at yield, N | 153 | 151 | 162 | 166 | 156 | 145 |
| Displacement at yield, mm | 20.2 | 20.7 | 24.5 | 21.4 | 23.6 | 25.6 |

EXAMPLE 6

Thermosetting Adhesive 6 is made in the same general way as described in Example 1, except that the rubbers used are Hycar® 200X162 and Hycar® 1300X8. Hycar 200X162 is a carboxyl-terminated butadiene homopolymer, reported by its manufacturer to have a molecular weight of 4200, an average carboxyl functionality of 1.9 and a glass transition temperature of −77° C. The overall proportions of raw materials (exclusive of catalysts) are:

| | |
|---|---|
| DER 331 epoxy resin | 32.1 parts |
| Hycar ® 2000X162 rubber | 12.4 parts |
| Hycar ® 1300X8 rubber | 8.9 parts |
| DER 661 epoxy resin | 22.3 parts |
| Dicyandiamide | 4.3 parts |
| Microspheres | 14.0 parts |
| Clay | 6.0 parts |

The acrylonitrile content of Thermosetting Adhesive 6 is 1.6% by weight.

What is claimed is:

1. A reinforcing sheet comprising at least one layer of a reinforcing material and a layer of a solid thermosetting adhesive, wherein the thermosetting adhesive includes (a) a curing agent and (b) an epoxy-terminated adduct of an epoxy resin and a conjugated diene or conjugated diene/nitrile rubber containing not more than about 15% by weight polymerized nitrile monomer, and wherein said thermosetting adhesive contains no more than about 3.5% by weight polymerized nitrile monomer.

2. The reinforcing sheet of claim 1 wherein the rubber has a number average molecular weight of from about 2000–6000 and a $T_g$ of less than −55° C.

3. The reinforcing sheet of claim 2 wherein the rubber is carboxyl- or amine-terminated.

4. The reinforcing sheet of claim 3 wherein the epoxy resin is a liquid or solid glycidyl ether of a bisphenol.

5. The reinforcing sheet of claim 4 wherein the reinforcing material is an aluminum foil or a woven fabric having a thickness of from about 0.003 to about 0.05 inch.

6. The reinforcing sheet of claim 5 which has an overall thickness of from about 0.03 to about 0.1 inch.

7. The reinforcing sheet of claim 6 wherein the solid thermosetting adhesive contains microspheres, a blowing agent, or both.

8. The reinforcing sheet of claim 7 wherein the curing agent is dicyandiamide.

9. The reinforcing sheet of claim 5 wherein said epoxy-terminated adduct is a reaction product of (1) an epoxy resin, (2) a high nitrile rubber and (3) a rubber selected from the group consisting of a conjugated diene and a conjugated diene/nitrile rubber containing not more than about 15% by weight polymerized nitrile monomer.

10. A method of reinforcing a substrate, comprising (A) applying to the substrate a reinforcing sheet comprising at least one layer of a reinforcing material and a layer of a solid thermosetting adhesive, wherein the thermosetting adhesive includes (a) a curing agent and (b) an epoxy-terminated adduct of an epoxy resin and a conjugated diene or conjugated diene/nitrile rubber containing not more than about 15% by weight polymerized nitrile monomer, and wherein said thermosetting adhesive contains no more than about 3.5% by weight polymerized nitrile monomer, and then (B) curing said thermosetting adhesive.

11. The method of claim 10, wherein said substrate is at a temperature of from about 15° C. to about 22° C. when said reinforcing sheet is applied, contaminated with oil when said reinforcing sheet is applied, or both.

12. The method of claim 11 wherein the rubber has a number average molecular weight of from about 2000–6000 and a $T_g$ of less than −55° C.

13. The method of claim 12 wherein the rubber is carboxyl- or amine-terminated.

14. The method of claim 13 wherein the epoxy resin is a liquid or solid glycidyl ether of a bisphenol.

15. The method of claim 14 wherein the reinforcing material is an aluminum foil or a woven fabric having a thickness of from about 0.003 to about 0.05 inch.

16. The method of claim 15 which has an overall thickness of from about 0.03 to about 0.1 inch.

17. The method of claim 16 wherein the solid thermosetting adhesive contains microspheres, a blowing agent, or both.

18. The method of claim 17 wherein the curing agent is dicyandiamide.

19. The method of claim 15 wherein said epoxy-terminated adduct is a reaction product of (1) an epoxy resin, (2) a high nitrile rubber and (3) a rubber selected from the group consisting of a conjugated diene and a conjugated diene/nitrile rubber containing not more than about 15% by weight polymerized nitrile monomer.

20. The method of claim 11 wherein said substrate is painted after step (A) and the thermosetting layer and said paint are simultaneously cured.

* * * * *